(12) United States Patent
Jung

(10) Patent No.: US 12,501,816 B2
(45) Date of Patent: Dec. 16, 2025

(54) DISPLAY APPARATUS

(71) Applicant: LG Display Co., Ltd., Seoul (KR)

(72) Inventor: Jaeho Jung, Daegu (KR)

(73) Assignee: LG Display Co., Ltd, Seoul (KR)

( * ) Notice: Subject to any disclaimer, the term of this patent is extended or adjusted under 35 U.S.C. 154(b) by 344 days.

(21) Appl. No.: 18/050,536

(22) Filed: Oct. 28, 2022

(65) Prior Publication Data

US 2023/0180520 A1 Jun. 8, 2023

(30) Foreign Application Priority Data

Dec. 8, 2021 (KR) .................. 10-2021-0174429

(51) Int. Cl.
*H10K 59/80* (2023.01)

(52) U.S. Cl.
CPC ............................. *H10K 59/8794* (2023.02)

(58) Field of Classification Search
CPC .... H10K 50/87; H10K 59/38; H10K 59/8792; H10K 59/8794; H10K 59/131; G09F 9/301; H01K 7/20963; H01K 7/20427; H01K 7/20509; H05K 5/03; H01L 23/02–26; H01L 21/565–566; H01L 21/56–568; H01L 21/52–54; H01L 21/4817; H01L 21/4803–481; H01L 23/28–3192; H01L 23/42–4338; H01L 23/16–26; H01L 23/552–556; H01L 2924/181–186; H01L 2924/15–17798; H01L 25/165

See application file for complete search history.

(56) References Cited

U.S. PATENT DOCUMENTS

| | | | | |
|---|---|---|---|---|
| 2011/0272588 | A1* | 11/2011 | Jadrich | G01T 1/20 250/370.11 |
| 2016/0349567 | A1* | 12/2016 | Kwon | G02F 1/133308 |
| 2017/0064869 | A1* | 3/2017 | Siahaan | B23P 15/26 |
| 2020/0192433 | A1* | 6/2020 | Shin | G09F 9/301 |

FOREIGN PATENT DOCUMENTS

| | | | |
|---|---|---|---|
| CN | 107221556 A | | 9/2017 |
| CN | 110602933 A | | 12/2019 |
| JP | 2008256773 A | * | 10/2008 |
| KR | 2012073074 A | * | 7/2012 |
| KR | 10-1463683 B1 | | 10/2014 |
| KR | 10-2020-0134361 A | | 12/2020 |
| WO | WO-2021031613 A1 | * | 2/2021 ............. F28F 21/06 |

OTHER PUBLICATIONS

Office Action in Chinese Appln. No. 202211349961.4, mailed on Jun. 29, 2025, 15 pages (with English translation).

* cited by examiner

*Primary Examiner* — Steven B Gauthier
*Assistant Examiner* — Adam D Weiland
(74) *Attorney, Agent, or Firm* — Fish & Richardson P.C.

(57) ABSTRACT

A display apparatus includes a cover window; a display module attached to a bottom surface of the cover window; a core plate attached to a bottom surface of the display module; and a back cover accommodating the display module and the core plate, wherein the back cover is attached to a bottom surface of the cover window, wherein the core plate includes: a heat-dissipating portion having a top surface attached to the display module; and a thermal insulation portion received in a groove formed in the heat-dissipating portion.

15 Claims, 3 Drawing Sheets

DISPLAY APPARATUS

CROSS-REFERENCE TO RELATED APPLICATION

This application claims the priority of Korean Patent Application No. 10-2021-0174429 filed on Dec. 8, 2021, which is hereby incorporated by reference in its entirety.

BACKGROUND

Field of the Disclosure

The present disclosure relates to a display apparatus, and more particularly, to a thin display apparatus with improved heat dissipation performance.

Description of the Background

As society enters a full-fledged information age, various display apparatuses that process and display a large amount of information have been developed. A flat panel display apparatus including a liquid crystal display apparatus (LCD), an organic light-emitting display apparatus (OLED), and a quantum dot display apparatus are on the spotlight.

Recently, research on thin and light display panels has been actively conducted. A flexible display apparatus in which a display panel may be bent or may be folded and unfolded is also being supplied.

The flexible display apparatus is used in a wide variety of information apparatuses such as televisions, monitors, smart phones, tablet PCs, notebook computers, and wearable devices.

Further, various vehicle display apparatuses such as a digital dashboard (or cluster), a central information display (CID), and a rear seat entertainment (RSE) display are also used in vehicles such as cars. A flexible display apparatus is used in these various display apparatuses for vehicles. In this regard, research is being conducted to integrate the digital dashboard and the central information display into one display using a flexible display that may be implemented in various shapes.

When the display apparatus operates, a lot of heat is generated from a display panel. When the heat generated from the display panel is not effectively dissipated to an outside, a lifespan of the display panel may be shortened. Further, when the display apparatus operates, a lot of heat is generated from a control printed circuit board that controls an operation of the display panel. When the heat generated from the control printed circuit board is transferred to the display panel, the lifespan of the display panel may be shortened.

Therefore, there is a need for a component design capable of effectively controlling internal heat while maintaining a thin structure of the display apparatus.

SUMMARY

Accordingly, the present disclosure is to provide a display apparatus that can be thin and improve heat dissipation performance.

The present disclosure is not limited to the above-mentioned features and other advantages of the present disclosure that are not mentioned may be understood based on following descriptions, and may be more clearly understood based on aspects of the present disclosure. Further, it will be easily understood that the features and advantages of the present disclosure may be realized using means shown in the claims and combinations thereof.

A display apparatus according to one aspect of the present disclosure includes a cover window; a display module attached to a bottom surface of the cover window; a core plate attached to a bottom surface of the display module; and a back cover accommodating the display module and the core plate, wherein the back cover is attached to a bottom surface of the cover window, wherein the core plate includes: a heat-dissipating portion having a top surface attached to the display module; and a thermal insulation portion received in a groove formed in the heat-dissipating portion.

A display apparatus according to another aspect of the present disclosure includes a display module including a display panel and a heat-dissipating plate disposed under the display panel; and a core plate attached to the heat-dissipating plate of the display module, wherein the core plate includes a first portion having a first thermal conductivity and a second portion having a second thermal conductivity lower than the first thermal conductivity.

Specific details of other aspects are included in the detailed description and drawings.

According to an aspect of the present disclosure, the core plate having the heat-dissipating portion may be attached to the display module, thereby providing a thin display apparatus with improved heat dissipation performance.

According to an aspect of the present disclosure, the core plate having the thermal insulation portion may be attached to the display module, thereby providing a display apparatus capable of preventing transfer of heat generated from the control printed circuit board to the display panel.

According to an aspect of the present disclosure, the core plate may be attached to the display module and the back cover may be attached to a bottom surface of the cover window, thereby providing a display apparatus in which a bezel width may be reduced.

Effects of the present disclosure are not limited to the above-mentioned effects, and other effects as not mentioned will be clearly understood by those skilled in the art from following descriptions.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
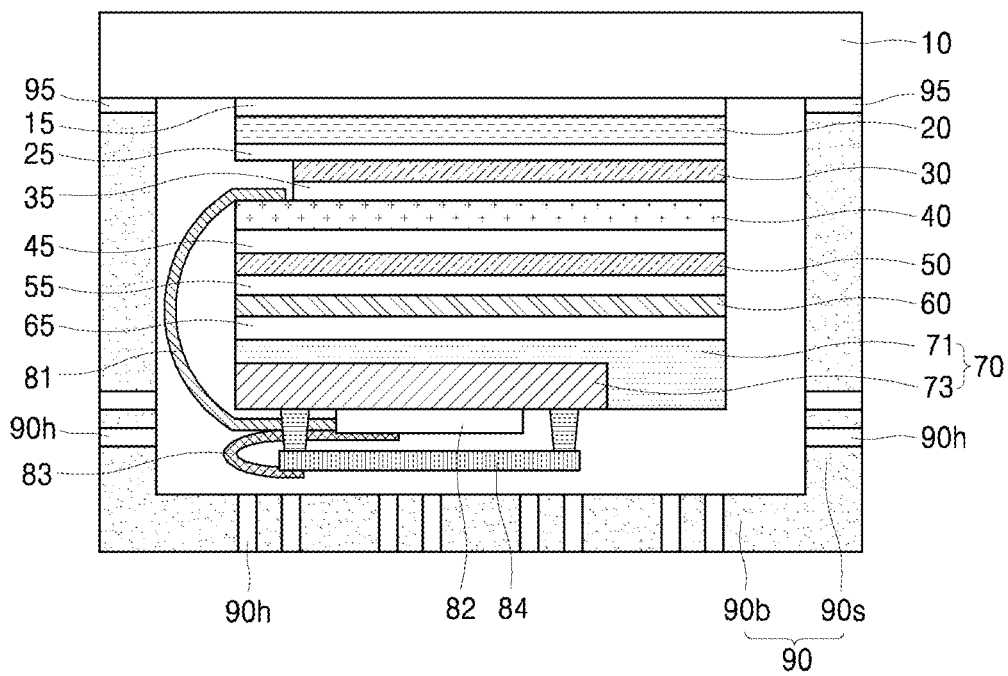
FIG. 1 is a cross-sectional view showing a display apparatus according to an aspect of the present disclosure.

Advantages and features of the present disclosure, and a method of achieving the advantages and features will become apparent with reference to aspects described later in detail together with the accompanying drawings. However, the present disclosure is not limited to aspects as disclosed below, but may be implemented in various different forms. Thus, these aspects are set forth only to make the present disclosure complete, and to completely inform the scope of the present disclosure to those of ordinary skill in the technical field to which the present disclosure belongs, and the present disclosure is only defined by the scope of the claims.

A shape, a size, a ratio, an angle, a number, etc. disclosed in the drawings for describing the aspects of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular aspects only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like may be disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like may be disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In interpreting a numerical value, the value is interpreted as including an error range unless there is a separate explicit description thereof.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various aspects of the present disclosure may be partially or entirely combined with each other, and may be technically associated with each other or operate with each other. The aspects may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display apparatus according to aspects of the present disclosure will be described in detail with reference to the accompanying drawings.

Figure 2:
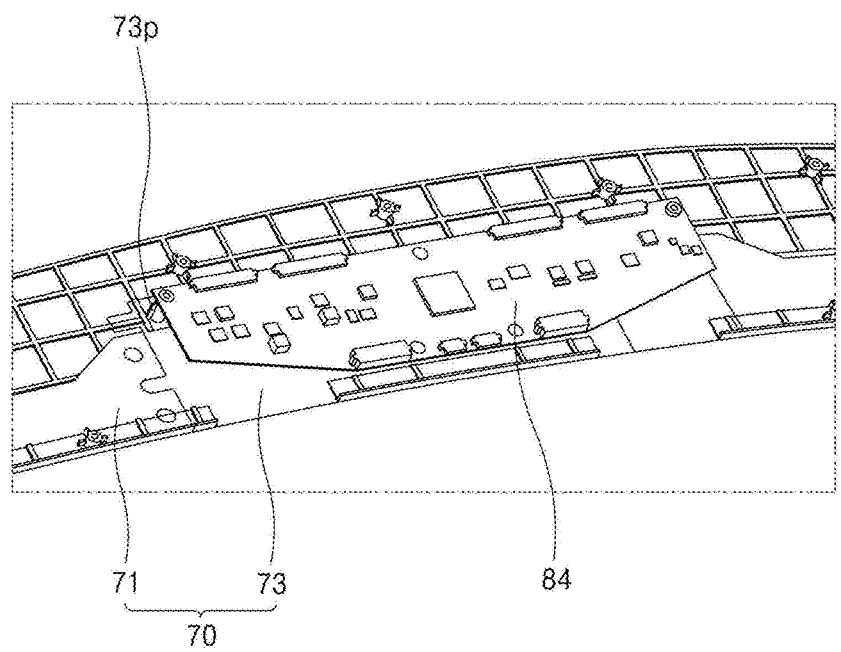
FIG. 2 is a perspective view showing a core plate according to an aspect of the present disclosure.

FIG. 1 is a cross-sectional view showing a display apparatus according to an aspect of the present disclosure. FIG. 2 is a perspective view showing a core plate according to an aspect of the present disclosure.

Referring to FIG. 1 and FIG. 2, a display apparatus according to an aspect of the present disclosure may include a cover window 10, a light control film 20, a polarizing film 30, a display panel 40, a support plate 50, a heat-dissipating plate 60, a core plate 70, a source printed circuit board 82, a control circuit board 84 and a back cover 90. Further, the display apparatus according to an aspect of the present disclosure may further include a first adhesive layer 15, a second adhesive layer 25, a third adhesive layer 35, a fourth adhesive layer 45, a fifth adhesive layer 55, a sixth adhesive layer 65, and a seventh adhesive layer 95.

The cover window 10 may be made of a transparent material to allow light emitted from the display panel 40 to pass therethrough. The cover window may protect the display panel 40 from external impact, moisture, heat, etc. The cover window 10 may be made of transparent glass or a transparent plastic material. A hard coating layer may be additionally formed on a surface of the cover window 10.

The light control film 20 may be attached to a bottom surface of the cover window 10 via the first adhesive layer 15. The light control film 20 may adjust an angle of light emitted from the display panel 110 vertically or horizontally to prevent a viewing angle from being increased in an unnecessary direction. The first adhesive layer 15 may be made of a transparent adhesive member such as OCA (Optical Clear Adhesive) or OCR (Optical Clear Resin).

The polarizing film 30 may be attached to a bottom surface of the light control film 20 via the second adhesive layer 25. The polarizing film 30 may prevent reflection of light coming from an outside to provide a function to improve visibility of the display panel 40. The second adhesive layer 25 may be made of a transparent adhesive member such as OCA (Optical Clear Adhesive) or OCR (Optical Clear Resin).

The display panel 40 may be attached to a bottom surface of the polarizing film 30 via the third adhesive layer 35. The display panel 40 may be flexible. For example, the display panel 40 may be embodied as an organic light-emitting display panel, but is not limited thereto. The display panel 40 may be embodied as various types, for example, a liquid crystal display panel, a quantum dot display panel, and the like. When the display panel 40 is embodied as the organic light-emitting display panel, the display panel 40 may include a substrate, a thin film transistor array including thin film transistors (for example, a switching thin film transistor and a driving thin film transistor) for pixels disposed on the substrate, organic light-emitting elements for pixel areas connected to the thin film transistors, and an encapsulation layer covering the organic light-emitting elements to prevent penetration of moisture and oxygen from an outside into the organic light-emitting elements. The display panel 40 may further include a touch sensor formed on the encapsulation layer. The third adhesive layer 35 may be made of a transparent adhesive member such as OCA (Optical Clear Adhesive) or OCR (Optical Clear Resin).

In one aspect, a touch panel may be additionally provided between the light control film 20 and the polarizing film 30.

The support plate 50 may be attached to a bottom surface of the display panel 40 via the fourth adhesive layer 45 and may support the display panel 40 thereon. The support plate 40 may be made of, for example, a polymer material. The polymer material may include, for example, polymethylmetacrylate (PMMA), polycarbonate (PC), polyacrylate (PA), polyvinylalcohol (PVA), acrylonitrile-butadiene-styrene (ABS), polyethylene terephthalate (PET), but is not limited thereto. The fourth adhesive layer 45 may be made of a transparent adhesive member such as OCA (Optical Clear Adhesive) or OCR (Optical Clear Resin), or a thermally conductive adhesive member.

The heat-dissipating plate 60 may be attached to a bottom surface of the support plate 50 via the fifth adhesive layer 55 and may dissipate the heat generated from the display panel 40. The heat-dissipating plate 60 may be made of, for example, aluminum or copper. However, the material of the heat-dissipating plate 120 is not limited thereto. The heat-dissipating plate 60 may be made of any one of gold, silver, magnesium, carbon fiber, graphite, graphene, or a combination thereof having excellent thermal conductivity. The fifth adhesive layer 55 may be made of a transparent adhesive member such as OCA (Optical Clear Adhesive) or OCR (Optical Clear Resin), or a thermally conductive adhesive member.

When the display panel 40 is embodied as the organic light-emitting display panel, the organic light-emitting elements may deteriorate due to the heat generated during operation. Thus, it is important to dissipate the heat to the outside In accordance with the present disclosure, the light control film 20, the polarizing film 30, the display panel 40, the support plate 50 and the heat-dissipating plate 60 collectively constitute a display module.

The core plate 70 may be attached to a bottom surface of the heat-dissipating plate 60 via the sixth adhesive layer 65. In other words, the core plate 70 may be attached to the bottom surface of the display module via the sixth adhesive layer 65. The sixth adhesive layer 65 may be made of a transparent adhesive member such as OCA (Optical Clear Adhesive) or OCR (Optical Clear Resin), or a thermally conductive adhesive member.

The core plate 70 may include a heat-dissipating portion 71 having a top surface thereof attached to the display module, that is, attached to the heat-dissipating plate 60, and a thermal insulation portion 73 received in a groove formed in the heat-dissipating portion 71. A bottom surface of the thermal insulation portion 73 and a bottom surface of the heat-dissipating portion 71 may constitute a bottom surface of the core plate 70. The thermal insulation portion 73 has lower thermal conductivity than that of the heat-dissipating portion 71. The heat-dissipating portion 71 may be made of a metal having high thermal conductivity, and the thermal insulation portion 73 may be made of a polymer having a lower thermal conductivity than that of the metal. The heat-dissipating portion 71 may be made of, for example, a metal such as gold, silver, copper, aluminum, or magnesium. The thermal insulation portion 73 may be made of, for example, a polymer such as polyurethane, polyethylene, polycarbonate, or polystyrene. The core plate 70 including the different materials may be manufactured in an insert injection manner.

When the core plate 70 is directly attached to the heat-dissipating plate 60, heat is transferred via conduction. Thus, heat is dissipated more effectively than when an air gap is formed between the core plate 70 and the heat-dissipating plate 60 for air convection. Further, when the core plate 70 is directly attached to the heat-dissipating plate 60, a total thickness of the display apparatus may be smaller. Since the thermal insulation portion 73 is received in the groove of the heat-dissipating portion 71, a total thickness of the core plate 70 does not increase. This is advantageous in realizing a thin display apparatus.

The source printed circuit board 82 and the control printed circuit board 84 for driving the display panel 40 may be disposed on a bottom surface of the core plate 70.

A gate driver for outputting a scan signal to a plurality of gate lines may be disposed at one side (left or right side) of the display panel 40. The gate driver may be located at only one side of the display panel 40 or at each of both opposing sides thereof according to a driving scheme. The gate driver may include one or more gate driver integrated circuits. Each gate driver integrated circuit may be implemented in a Chip On Film (COF) scheme in which the gate driver integrated circuit is mounted on a film connected to the display panel 40, or in a GIP (Gate Driver In Panel) scheme in which the gate driver integrated circuit is placed directly on the display panel 40. A source driver for outputting a data voltage to a plurality of data lines may be disposed at a lower side of the display panel 40. The source driver may include one or more source driver integrated circuits. The source driver may be implemented in a Chip On Film (COF) scheme. That is, the source driver may be composed of a flexible circuit film 81 and a source driver integrated circuit mounted on the flexible circuit film 81. In this case, one end of the flexible circuit film 81 is bonded to the source printed circuit board 82, and the other end thereof is bonded to the display panel 40.

Circuits for processing signals provided to the gate driver and the source driver to switch a data direction and a scan direction may be disposed in the source printed circuit board 82.

A timing controller that provides control signals to control an operation of each of the gate driver and the source driver, and a power management integrated circuit (PMIC) that supplies various voltages or currents to the gate driver and the data driver, or controls the various voltages or currents to be supplied may be mounted in the control printed circuit board 84.

The control printed circuit board 84 may be connected to the source printed circuit board 82 via a connection medium 83 such as a flexible flat cable (FFC) or a flexible printed circuit (FPC).

A position of each of the source printed circuit board 82 and the control printed circuit board 84 may correspond to a position of the thermal insulation portion 73 of the core plate 70. The source printed circuit board 82 may be disposed to contact the thermal insulation portion 73 of the core plate 70, while the control printed circuit board 84 may be disposed to be spaced apart from the thermal insulation portion 73 of the core plate 70. The control printed circuit board 84 may be supported by thermal insulation pillars 73*p* protruding from the thermal insulation portion 73 of the core plate 70.

A lot of heat is generated from the control printed circuit board 84 during operation of the display panel 40. For this reason, the core plate 70 includes the thermal insulation portion 73 facing the control printed circuit board 84, thereby preventing transfer of the heat generated from the control printed circuit board 84 to the display panel 40. The thermal insulation portion 73 of the core plate 70 may have a larger area than that of the control printed circuit board 84. This may more effectively prevent the heat generated from the control printed circuit board 84 from being transferred to the display panel 40. Further, the control printed circuit board 84 may be spaced from the thermal insulation portion 73 of the core plate 70, thereby preventing the heat generated from the control printed circuit board 84 from being transmitted directly to the display panel 40.

Meanwhile, the heat-dissipating portion 71 of the core plate 70 may discharge the heat which is generated in the display panel 40 and transferred to the heat-dissipating plate 60 to the outside.

In this way, the core plate 70 is composed of the heat-dissipating portion 71 and the thermal insulation portion 73 to discharge the heat generated from the display panel 40 to the outside, and at the same time, prevent the heat generated from the control printed circuit board 84 from being transmitted to the display panel 40.

In this manner, the core plate 70 including the heat-dissipating portion 71 and the thermal insulation portion 73 may be attached to the heat-dissipating plate 60, such that when the display panel 40 is embodied as the organic light-emitting display panel, deterioration of the organic light-emitting elements may be prevented, thereby extending the lifespan of the organic light-emitting elements.

The back cover 90 may accommodate the display module and the core plate 70, and may be attached to a bottom surface of the cover window 10. The back cover 90 may include a bottom portion 90*b* and sidewalls 90*s* extending from the bottom portion 90*b* and covering side surfaces of the display module. The sidewalls 90*s* of the back cover 90 may be attached to an edge of the bottom surface of the cover window 10 via the seventh adhesive layer 95. The back cover 90 may be made of plastic, carbon fiber reinforced plastic (CFRP), or metal.

A plurality of openings 90*h* may be formed in the bottom portion 90*b* and the sidewalls 90*s* of the back cover 90 so that outside air may be introduced into an inner space defined by the back cover 90. When the outside air circulates through the plurality of openings 90*h*, the heat transferred to the core plate 70 and the heat generated from the control printed circuit board 84 may be efficiently discharged to the outside.

Outer surfaces of the sidewalls 90*s* of the back cover 90 do not protrude outwardly beyond the edges of the cover window 10. The outer surfaces of the sidewalls 90*s* of the back cover 90 may be aligned with the edges of the cover window 10. For this reason, the display apparatus according to aspects of the present disclosure may implement a much narrower bezel, compared to a case where inner surfaces of the sidewalls 90*s* of the back cover 90 are attached to the outer side surface of the cover window 10.

Figure 3:
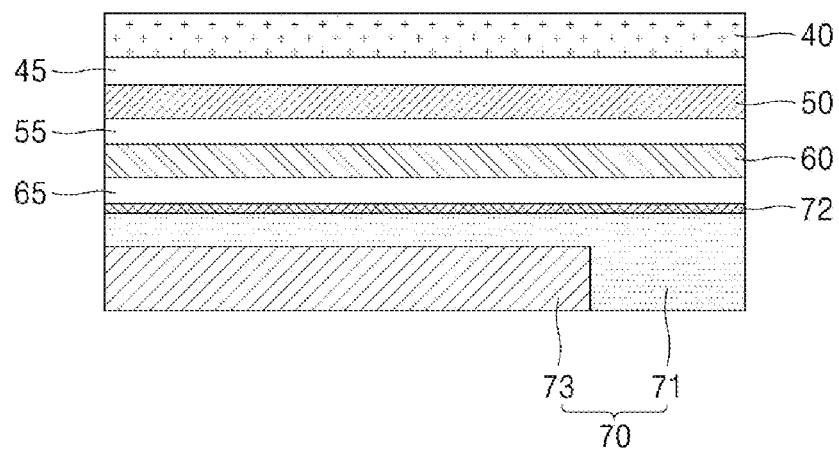
FIGS. 3 and 4 are cross-sectional views illustrating a portion of a display apparatus according to various aspects of the present disclosure.
Figure 4:
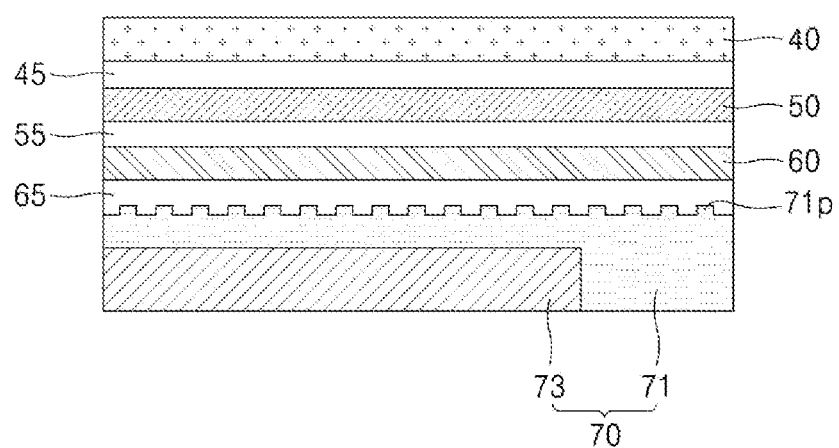

FIGS. 3 and 4 are cross-sectional views illustrating a portion of a display apparatus according to aspects of the present disclosure. FIG. 3 and FIG. 4 show the display panel 40, the support plate 50, the heat-dissipating plate 60, the core plate 70, and the adhesive layers 45, 55, and 65 among the components of the display apparatus as shown in FIG. 1.

Referring to FIG. 3, a heat dissipation coating 72 may be further disposed on a top surface of the core plate 70. The heat dissipation coating 72 may cover an entirety of the top surface of the heat-dissipating portion 71 of the core plate 70. The heat dissipation coating 72 may include any one of carbon nanotubes, graphene, diamond, graphite, and carbon black. The heat dissipation coating 72 may allow the heat transferred from the heat-dissipating plate 60 to quickly spread along the top surface of the core plate 70, thereby helping to dissipate the heat that may not be transferred to the rear surface of the core plate 70 due to the thermal insulation portion 73 to the outside. The heat dissipation coating 72 may improve the heat dissipation performance of the core plate 70.

Referring to FIG. 4, an unevenness pattern 71*p* may be further disposed on a top surface of the core plate 70. The unevenness pattern 71*p* may be disposed on an entirety of a top surface of the heat-dissipating portion 71 of the core plate 70. The unevenness pattern 71*p* may increase a thermal contact area to help dissipate the heat transferred from the heat-dissipating plate 60 to the outside. The unevenness pattern 71*p* may improve the heat dissipation performance of the core plate 70.

Further, under the presence of the unevenness pattern 71*p*, an adhesion area of the core plate 70 may be increased, so that adhesion between the heat-dissipating plate 60 and the core plate 70 may be firmly formed.

An aspect shown in FIG. 3 and an aspect shown in FIG. 4 may be combined with each other. That is, the heat dissipation coating 72 may be disposed on the top surface of the core plate 70 on which the unevenness pattern 71*p* has been formed. In this case, the heat dissipation performance of the core plate 70 may be further improved.

Figure 5:
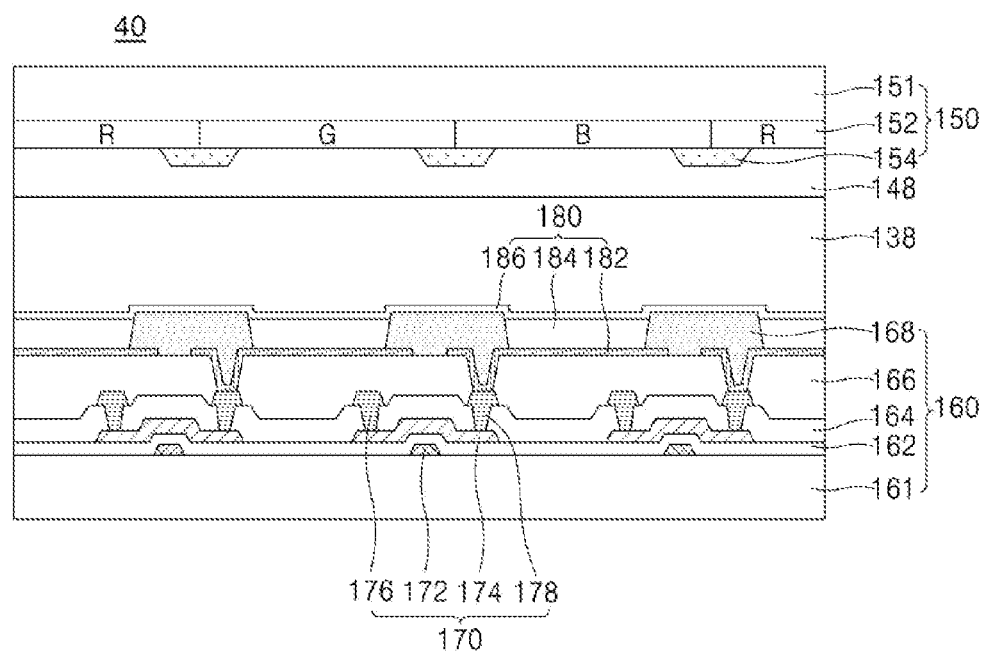
FIG. 5 is a cross-sectional view showing a display panel of a display apparatus according to an aspect of the present disclosure.

FIG. 5 is a cross-sectional view showing a display panel of a display apparatus according to an aspect of the present disclosure.

The display panel 40 includes a color filter array 150 and a thin film transistor array 160. The display panel 40 may be embodied as an organic light-emitting display panel.

The thin film transistor array 160 may include a thin film transistor 170 formed on a lower substrate 161 and an organic light-emitting element 180 formed on the thin film transistor 170. The thin film transistor 170 includes a gate electrode 172, a semiconductor layer 174 overlapping the gate electrode 172 while the gate insulating layer 162 is interposed therebetween, and a source electrode 176 and a drain electrode 178 formed on a first passivation layer 164 and contacting the semiconductor layer 174.

An anode electrode 182 may be electrically connected to the drain electrode 178 of the thin film transistor 170. In one example, unlike what is shown in FIG. 5, the anode electrode 182 may be electrically connected to the source electrode 176 of the thin film transistor 170. An organic light-emitting layer 184 may be formed on the anode electrode 182 and in a light emitting area defined by a bank 168 and may emit white light. The organic light-emitting layer 184 may include a stack structure in which a hole-related layer, a light-emitting layer, and an electron-related layer are sequentially stacked on the anode electrode 182 in this order or in a reverse order. A cathode electrode 186 is formed on the organic light-emitting layer 184 and the bank 168. An encapsulation layer 138 is formed to cover the organic light-emitting element 180. The encapsulation layer 138 may prevent penetration of moisture and oxygen into the organic light-emitting element layer.

The color filter array 150 may be disposed on and attached to the encapsulation layer 138 via an adhesive layer 140. The color filter array 150 may include a black matrix 154 and a color filter 152 stacked on an upper substrate 151. The color filter 152 may include a red color filter, a green color filter and a blue color filter. The red, green, and blue color filters may be formed on the upper substrate 151 and in transmission areas defined by the black matrix 154 and may implement corresponding colors, respectively. In one example, unlike what is shown in FIG. 5, the black matrix 154 may be disposed between the upper substrate 151 and the color filter 152.

A structure of the display panel 40 as shown in FIG. 5 is only an example. Display panels of various structures may be employed in the display apparatus. For example, the display panel may be embodied as an organic light-emitting display panel that does not include the color filter and the black matrix. The organic light-emitting element may be formed in a light-emitting area defined by a black bank, and may include a red light-emitting element, a green light-emitting element, and a blue light-emitting element.

A display apparatus according to aspects of the present disclosure may be described as follows.

A first aspect of the present disclosure provides a display apparatus comprising: a cover window; a display module attached to a bottom surface of the cover window; a core plate attached to a bottom surface of the display module; and a back cover accommodating the display module and the core plate, wherein the back cover is attached to a bottom surface of the cover window, wherein the core plate includes: a heat-dissipating portion having a top surface attached to the display module; and a thermal insulation portion received in a groove formed in the heat-dissipating portion.

In one aspect of the present disclosure, the display apparatus further comprises a control printed circuit board disposed on a bottom surface of the core plate, wherein the thermal insulation portion is located between the heat-dissipating portion and the control printed circuit board.

In one aspect of the present disclosure, the thermal insulation portion has a larger area than an area of the control printed circuit board.

In one aspect of the present disclosure, the display module includes: a display panel; a support plate attached to a bottom surface of the display panel; and a heat-dissipating plate attached to a bottom surface of the support plate, wherein the heat-dissipating portion of the core plate and the heat-dissipating plate are attached to each other via a thermally conductive adhesive member.

In one aspect of the present disclosure, the heat-dissipating portion is made of a metal, and the thermal insulation portion is made of a polymer having lower thermal conductivity than thermal conductivity of the metal.

In one aspect of the present disclosure, an unevenness pattern is disposed on a top surface of the heat-dissipating portion.

In one aspect of the present disclosure, a heat dissipating coating is disposed on a top surface of the heat-dissipating portion.

In one aspect of the present disclosure, the heat dissipation coating includes at least one selected from a group consisting of carbon nanotube, graphene, diamond, graphite, and carbon black.

In one aspect of the present disclosure, the back cover includes a bottom portion, and sidewalls extending vertically from the bottom portion and covering side surfaces of the display module, wherein outer surfaces of the sidewalls do not protrude outwardly beyond edges of the cover window.

In one aspect of the first aspect, a plurality of openings are defined in the bottom portion and the sidewalls of the back cover.

A second aspect of the present disclosure provides a display apparatus comprising: a display module including a display panel and a heat-dissipating plate disposed under the display panel; and a core plate attached to the heat-dissipating plate of the display module, wherein the core plate includes a first portion having a first thermal conductivity and a second portion having a second thermal conductivity lower than the first thermal conductivity.

In one aspect of the present disclosure, the display apparatus further comprises a control printed circuit board disposed under the core plate and configured to control an operation of the display panel, wherein the second portion has a larger area than an area of the control printed circuit board and faces the control printed circuit board.

In one aspect of the present disclosure, the first portion is made of a metal, and the second portion is made of a polymer.

In one aspect of the present disclosure, an unevenness pattern is disposed on a top surface of the first portion.

In one aspect of the present disclosure, a heat dissipation coating is disposed on a top surface of the first portion.

A scope of protection of the present disclosure should be construed by the scope of the claims, and all technical ideas within the scope equivalent thereto should be construed as being included in the scope of the present disclosure. Although the aspects of the present disclosure have been described in more detail with reference to the accompanying drawings, the present disclosure is not necessarily limited to these aspects. The present disclosure may be implemented in various modified manners within the scope not departing from the technical idea of the present disclosure. Accordingly, the aspects disclosed in the present disclosure are not intended to limit the technical idea of the present disclosure, but to describe the present disclosure. The scope of the technical idea of the present disclosure is not limited by the aspects. Therefore, it should be understood that the aspects as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A display apparatus comprising:
   a cover window;
   a display module attached to a bottom surface of the cover window;
   a core plate attached to a bottom surface of the display module;
   a back cover accommodating the display module and the core plate, wherein the back cover is attached to the bottom surface of the cover window; and
   a printed circuit board disposed on a bottom surface of the core plate,
   wherein the core plate includes:
   a heat-dissipating portion having a top surface attached to the display module; and
   a thermal insulation portion disposed on at least a part of the bottom surface of the core plate,
   wherein the printed circuit board is disposed on the thermal insulation portion,
   wherein the heat-dissipating portion includes a groove, and the thermal insulating portion is disposed in the groove of the heat-dissipating portion.

2. The display apparatus of claim 1, wherein the printed circuit board includes a control printed circuit board for driving the display module.

3. The display apparatus of claim 2, wherein the thermal insulation portion has a larger area than an area of the control printed circuit board.

4. The display apparatus of claim 1, wherein the display module includes:
   a display panel;
   a support plate attached to a bottom surface of the display panel; and
   a heat-dissipating plate attached to a bottom surface of the support plate,
   wherein the heat-dissipating portion of the core plate and the heat-dissipating plate are attached to each other via a thermally conductive adhesive member.

5. The display apparatus of claim 1, wherein the heat-dissipating portion is made of metal, and the thermal insulation portion is made of polymer having a lower thermal conductivity than a thermal conductivity of the metal.

6. The display apparatus of claim 1, wherein the top surface of the heat-dissipating portion includes an unevenness pattern.

7. The display apparatus of claim 1, further comprising a heat dissipating coating disposed on the top surface of the heat-dissipating portion.

8. The display apparatus of claim 7, wherein the heat dissipation coating includes one of carbon nanotube, graphene, diamond, graphite and carbon black.

9. The display apparatus of claim 1, wherein the back cover includes a bottom portion, and sidewalls extending vertically from the bottom portion and covering side faces of the display module,
   wherein outer surfaces of the sidewalls do not protrude outwardly beyond edges of the cover window.

10. The display apparatus of claim 9, wherein the bottom portion and the sidewalls of the back cover include a plurality of openings.

11. A display apparatus comprising:
    a display module including a display panel and a heat-dissipating plate disposed under the display panel;
    a core plate attached to the heat-dissipating plate of the display module; and
    a printed circuit board disposed on a bottom surface of the core plate,
    wherein the core plate includes a first portion having a first thermal conductivity and a second portion having a second thermal conductivity lower than the first thermal conductivity,
    wherein the second portion is disposed on at least a part of the bottom surface of the core plate, and
    wherein the printed circuit board is disposed on the second portion,
    wherein the first portion includes a groove, and the second portion is disposed in the groove of the first portion.

12. The display apparatus of claim 11, wherein the printed circuit board includes a control printed circuit board for driving the display module.

13. The display apparatus of claim 11, wherein the first portion is made of metal, and the second portion is made of polymer.

14. The display apparatus of claim 11, wherein the first portion has a top surface with an unevenness pattern.

15. The display apparatus of claim 11, further comprising a heat dissipation coating disposed on a top surface of the first portion.

* * * * *